United States Patent [19]

Darden

[11] Patent Number: 4,657,689

[45] Date of Patent: Apr. 14, 1987

[54] CORROSION-INHIBITED ANTIFREEZE/COOLANT COMPOSITION CONTAINING HYDROCARBYL SULFONATE

[75] Inventor: Jerome W. Darden, Thousand Oaks, Calif.

[73] Assignee: Texaco Inc., White Plains, N.Y.

[21] Appl. No.: 847,076

[22] Filed: Apr. 1, 1986

[51] Int. Cl.$^4$ .............................................. C09K 5/00
[52] U.S. Cl. .................................... 252/75; 106/14.13; 252/76; 252/78.1; 252/79; 252/389.62; 252/395
[58] Field of Search ...................... 252/75, 76, 78.1, 79, 252/389.62, 395; 106/14.13

[56] References Cited

U.S. PATENT DOCUMENTS

| | | | |
|---|---|---|---|
| 2,227,945 | 1/1941 | Neilson | 106/14.13 |
| 3,897,349 | 7/1975 | Marin et al. | 252/389.62 |
| 3,897,350 | 7/1975 | Heiba et al. | 252/75 |
| 4,342,596 | 8/1982 | Conner, Sr. | 106/14.27 |
| 4,382,008 | 5/1983 | Boreland et al. | 252/75 |
| 4,528,108 | 7/1985 | Grover | 252/75 |
| 4,584,119 | 4/1986 | Duranleau et al. | 252/75 |
| 4,587,028 | 5/1986 | Darden | 252/75 |
| 4,588,513 | 5/1986 | Triebel et al. | 252/75 |
| 4,592,853 | 6/1986 | Darden et al. | 252/75 |

OTHER PUBLICATIONS

Kallast et al., "Dialkylphenyl Sulfonates as Corrosion Inhibitors in Cooling Systems," Zashch. Met., 1981, 17(6), 747–8 (C.A. 96: 13050).

Primary Examiner—Robert A. Wax
Attorney, Agent, or Firm—Robert A. Kulason; James J. O'Loughlin; Robert B. Burns

[57] ABSTRACT

A corrosion-inhibited liquid alcohol antifreeze/coolant composition comprising aliphatic $C_5$–$C_{16}$ monobasic and $C_5$–$C_{16}$ hydrocarbyl dibasic acids/salts, a hydrocarbyl azole, and a hydrocarbyl alkali metal sulfonate which is either a $C_{10}$–$C_{20}$ alkyl benzene alkali metal sulfonate or a $C_{10}$–$C_{20}$ alpha-olefin alkali metal sulfonate having an average molecular weight in the range 200–2000 is described. Aqueous corrosion-inhibited antifreeze/coolant compositions based on the above-described concentrate composition, where said concentrate is diluted with 10–90 weight percent water, are also described.

14 Claims, No Drawings

CORROSION-INHIBITED ANTIFREEZE/COOLANT COMPOSITION CONTAINING HYDROCARBYL SULFONATE

BACKGROUND OF THE INVENTION

1. Field of the Invention

This invention relates to corrosion inhibited antifreeze/coolant concentrate formulations, and to aqueous antifreeze/coolant compositions for use in the cooling systems of internal combustion engines. More particularly, this invention relates to a corrosion-inhibited water soluble liquid alcohol antifreeze/coolant concentrate formulation comprising monobasic and dibasic acids and/or the alkali metal, ammonium, or amine salts of said acids, a hydrocarbyl azole, and a hydrocarbyl alkali metal sulfonate, and to aqueous antifreeze/coolant compositions containing the same.

Automobile engine cooling systems contain a variety of metals, including copper, solder, brass, steel, cast iron, aluminum, magnesium, and their alloys. The possibility of corrosive attack on such metals is high, due to the presence of various ions as well as the high temperatures, pressures, and flow rates found in such cooling systems. The presence of corrosion products within the cooling system can interfere with heat transfer from the engine combustion chambers, which may subsequently cause engine overheating and engine component failure due to excess metal temperatures. See generally Fay, R. H., "Antifreezes and Deicing Fluids," In: *Kirk-Othmer Encyclopedia of Chemical Technology* (1978 ed.), vol. 3, pp. 79-95. It would therefore be generally advantageous if the formation of corrosion products within automobile cooling systems could be controlled or eliminated. It is one object of the instant invention to provide a corrosion inhibited antifreeze/coolant useful in the prevention and control of corrosion in automobile engine cooling systems containing various metals.

The trend towards improved fuel economy for automobiles has led to the increased use of aluminum and in some cases magnesium for engine and cooling system components. However, it has been found that pitting and crevice corrosion are particularly prevalent in aluminum-containing cooling systems. Many conventional corrosion inhibitor additives used in automobile cooling systems do not provide adequate protection against the pitting and crevice corrosion phenomena found with various aluminum and magnesium alloys. It would therefore be particularly advantageous if the pitting and crevice corrosion phenomena found in automobile cooling systems containing aluminum or magnesium alloys could be controlled or eliminated. It is another object of the instant invention to provide a corrosion inhibited antifreeze/coolant for use in automobile cooling systems which prevents or controls pitting and crevice corrosion of aluminum and magnesium meal surfaces.

All corrosion inhibitors employed in automobile antifreeze/coolant formulations are gradually depleted by use and the build-up of corrosion products in the cooling system. It would thus be advantageous if the build-up of corrosion products within the system and subsequent corrosion inhibitor depletion or degradation could be controlled or eliminated. It is a further object of the instant invention to provide a corrosion inhibited antifreeze/coolant which is less prone to depletion or degradation than traditional corrosion inhibited antifreeze/coolant formulations.

2. Information Disclosure Statement

It is well known that various monobasic and dibasic acids as well as the salts of such acids are effective as corrosion inhibitors when employed in antifreeze/coolant formulations. For example, co-assigned U.S. Pat. Appl. Ser. No. 813,902, filed on Dec. 27, 1985 (incorporated herein by reference) describes various U.S. and foreign references which disclose the use of basic acids/salts as corrosion inhibitors in antifreeze/coolant formulations, and also discloses a corrosion inhibitor which comprises the combination of a $C_5$-$C_{16}$ aliphatic monobasic acid/salt, a $C_5$-$C_{16}$ hydrocarbyl dibasic acid/salt, and a hydrocarbyl triazole for use in engine antifreeze/coolant systems.

Various references also describe the use of sulfonic acid/sulfonate compounds as corrosion inhibitors. For example:

U.S. Pat. No. 4,528,108 describes an oleaginous coolant fluid composition comprising, as one component thereof, a basic metal salt of an organic acid such as sodium overbased alkyl benzene sulfonate;

Co-assigned U.S. Pat. No. 3,264,218 describes a corrosion-inhibited antifreeze composition comprising, as one component thereof, between 0.5-5.0 wt.% of a $CO_2$ neutralized basic alkaline earth metal hydrocarbon sulfonate having a molecular weight between about 900-1500;

U.S. Pat. No. 2,225,866 discloses a corrosion inhibited antifreeze composition comprising an alcohol, 1.0-3.0 wt.% of a mineral oil distillate, 1.0-5.0 wt.% water, 0.1-0.5 wt.% borax, 0.05-0.2 wt.% soap, 0.001 wt.% dye, 0.08-0.3 wt.% of an oil-soluble sulfonate, and sufficient alkali to give a pH of at least 9.5 to a 40% solution of said antifreeze composition in water;

Marshall, A. "Effective Inhibition for Cooling Systems," *Water Serv.* (London), Vol. 88 (1984), pp. 148-149 teaches the use of a sulfonated polymer in circulating water systems;

Eur. Pat. Appl. No. 093,508 describes the use of a maleic anhydride/styrene sulfonate copolymer in combination with other corrosion inhibitors in aqueous systems;

PCT Int. Appl. WO 8,302,628 describes the use of a composition for inhibiting the corrosion of iron based metals in contact with aqueous systems, where said composition comprises a water soluble organic phosphate and a sulfonic acid copolymer with a molecular weight range of 1,000-10,000;

CA Abstract, vol. 96, paragraph 13050y, p.440 (1982) teaches the use of sodium dialkylphenyl sulfonates as corrosion inhibitors in the cooling systems of internal combustion engines; and CA Abstract, vol. 99, paragraph 200334t (1983) describes the use of sodium alpha-olefin sulfonates in cleansers, shampoos, and detergents.

SUMMARY OF THE INVENTION

The instant invention is directed to a novel corrosion inhibited antifreeze/coolant concentrate composition, and to aqueous corrosion inhibited antifreeze/coolant compositions where said concentrate is diluted with 10-90, preferably 25-75 weight percent of water. The novel antifreeze/coolant compositions of the instant invention impart greater pitting corrosion protection than conventional antifreeze/coolant formulations.

The antifreeze/coolant concentrate composition of the instant invention comprises:

(a) from 80–99, preferably 90–99 weight percent of a water soluble liquid alcohol freezing point depressant;

(b) from 0.1–15.0, preferably 0.1–5.0 weight percent of a $C_5$–$C_{16}$ aliphatic monobasic acid or the alkali metal, ammonium, or amine salt of said acid;

(c) from 0.1–15.0, preferably 0.1–5.0 weight percent of a $C_5$–$C_{16}$ hydrocarbyl dibasic acid or the alkali metal, ammonium, or amine salt of said acid;

(d) from 0.1–0.5, preferably 0.1–0.3 weight percent of a hydrocarbyl azole; and (e) from 0.1–0.5 weight percent of a hydrocarbyl alkali metal sulfonate selected from the group consisting of:

(i) a $C_{10}$–$C_{20}$ alkyl benzene alkali metal sulfonate; and (ii) a $C_{10}$–$C_{20}$ alpha-olefin alkali metal sulfonate having an average molecular weight in the range of 200–2000, preferably 300–500.

DETAILED EMBODIMENTS OF THE INVENTION

The novel corrosion inhibited antifreeze/coolant concentrate formulation of the instant invention comprises: a water soluble liquid alcohol freezing point depressant; an aliphatic monobasic acid or the alkali metal, ammonium, or amine salt of said acid; a hydrocarbyl dibasic acid or the alkali metal, ammonium, or amine salt of said acid; a hydrocarbyl azole; and a hydrocarbyl alkali metal sulfonate which may be a $C_{10}$–$C_{20}$ alkyl benzene or alpha-olefin alkali metal sulfonate.

The liquid alcohol freezing point depressant component of the above-described antifreeze/coolant concentrate composition may be a glycol or glycol ether. The glycol ethers which may be employed as major components in the instant invention include glycols such as ethylene glycol, diethylene glycol, propylene glycol, dipropylene glycol, and glycol monoethers such as the methyl, ethyl, propyl, and butyl ethers of ethylene glycol, diethylene glycol, propylene glycol, and dipropylene glycol. The liquid alcohol freezing point depressant component may be employed in concentrations of 80% to 99% by weight, preferably 90% to 99% by weight. Ethylene glycol is particularly preferred as the liquid alcohol freezing point depressant component.

The aliphatic monobasic acid component of the above-described antifreeze/coolant may be any $C_5$–$C_{16}$ aliphatic monobasic acid or the alkali metal, ammonium, or amine salt of said acid, preferably at least one $C_8$–$C_{12}$ aliphatic monobasic acid or the alkali metal, ammonium, or amine salt of said acid. This would include one or more of the following acids or isomers thereof: octanoic, nonanoic, decanoic, undecanoic and dodecanoic, and mixtures thereof. Octanoic acid is particularly preferred. Any alkali metal, ammonium, or amine can be used to form the monobasic acid salt; however, alkali metals are preferred. Sodium and potassium are the preferred alkali metals for use in forming the monobasic acid salt. The aliphatic monobasic acid/salt may be employed at concentrations of about 0.1–15.0 wt.%, preferably about 0.1–5.0 wt.%.

The dibasic acid component of the above-described antifreeze/coolant may be any hydrocarbyl $C_5$–$C_{16}$ dibasic acid or the alkali metal, ammonium, or amine salt of said acid, preferably at least one $C_8$–$C_{12}$ hydrocarbyl dibasic acid or the alkali metal, ammonium, or amine salt of said acid. Included within this group are both aromatic and aliphatic $C_5$–$C_{16}$ dibasic acids and salts, preferably $C_8$–$C_{12}$ aliphatic dibasic acids and the alkali metal, ammonium, or amine salts of said acids. This would include one or more of the following acids: suberic, azelaic, sebacic, undecanedioic, dodecanedioic, the diacid of dicyclopentadiene (hereinafter referred to as DCPDDA), terephthalic, and mixtures thereof. Sebacic acid is particularly preferred. Any alkali metal, ammonium, or amine can be used to form the dibasic acid salt; however, alkali metals are preferred. Sodium and potassium are the preferred alkali metals for use in forming the dibasic acid salt. The hydrocarbyl dibasic acid/salt may be employed at concentrations of 0.1–15.0 wt.%, preferably 0.1–5.0 wt.%.

The hydrocarbyl azole component of the above-described antifreeze/coolant is preferably an aromatic triazole or an alkyl-substituted aromatic triazole such as benzotriazole or tolyltriazole, or a thiazole such as sodium mercaptobenzothiazole. The most preferred azole for use is tolyltriazole (hereinafter referred to as TTZ). The hydrocarbyl azole may be employed at concentrations of about 0.1–0.5 wt.%, preferably about 0.1–0.3 wt.%.

The hydrocarbyl alkali metal sulfonate component of the above-described antifreeze/coolant may be either a $C_{10}$–$C_{20}$ alkyl benzene alkali metal sulfonate or a $C_{10}$–$C_{20}$ alpha-olefin alkali metal sulfonate having a molecular weight in the range of 200–2000. The hydrocarbyl alkali metal sulfonate may be employed at concentrations of about 0.1–0.5 wt.%. Sodium and potassium are the preferred alkali metals for use in forming the hydrocarbyl sulfonate. Sodium alkyl benzene sulfonates particularly preferred for use include sodium dodecylbenzene sulfonate, commercially available from Witco Corp. under the Witconate 1250 trade name. Sodium alpha-olefin sulfonates particularly preferred for use include $C_{14}$–$C_{16}$ sodium alpha-olefin sulfonates having an average molecular weight in the range of 300–500, commercially available from Witco Corp. under the Witconate AOS trade name.

One or more conventional corrosion inhibitors may also be employed in the above-described antifreeze/coolant formulation. Such conventional corrosion inhibitors may be employed at concentrations of 0.01–5.0 wt.%, and may be selected from the group comprising: alkali metal hydroxides, alkali metal borates, alkali metal silicates, alkali metal benzoates, alkali metal nitrates, alkali metal nitrites, and alkali metal molybdates. Sodium hydroxide is particularly preferred. Commercially available antifoamants may also be employed.

In a preferred embodiment of the instant invention, the above-described antifreeze/coolant concentrate composition is diluted with 10% to 90%, preferably 25% to 75% by weight of water.

The method of this invention will be further illustrated by the following examples, which are not intended to limit the invention, but rather to illuminate it. In the following examples, all percents are weight percents unless otherwise specified.

EXAMPLE 1

(Control Example)

An antifreeze formulation was prepared comprising a major amount of ethylene glycol, 1.9% terephthalic acid, 1.5% sebacic acid, 0.1% TTZ, 2.9% sodium hydroxide (50% aqueous), and 0.3% octanoic acid.

EXAMPLE 2

To the antifreeze formulation of Example 1, 0.1% sodium dodecylbenzene sulfonate (Witconate 1250) was added.

EXAMPLE 3

(Comparative Example)

To the antifreeze formulation of Example 1, 0.1% of an ethoxylated carboxylate was added.

EXAMPLE 4

(Comparative Example)

To the antifreeze formulation of Example 1, 0.1% of a nonylphenol ethoxylate was added.

EXAMPLE 5

(Control Example)

An antifreeze formulation was prepared comprising a major amount of ethylene glycol, 3.9% DCPDDA, 2.7% sodium hydroxide (50% aqueous), 0.2% TTZ, and 0.3% octanoic acid.

EXAMPLE 6

To the antifreeze formulation of Example 5, 0.1% sodium dodecylbenzene sulfonate (Witconate 1250) was added.

EXAMPLE 6A

To the antifreeze formulation of Example 5, 0.2% sodium dodecylbenzene sulfonate (Witconate 1250) was added.

EXAMPLE 7

To the antifreeze formulation of Example 5, 0.1% of an alpha-olefin sulfonate (Witconate AOS) was added.

EXAMPLE 8

(Comparative Example)

An antifreeze formulation was prepared comprising a major amount of ethylene glycol, 3.9% DCPDDA, 2.7% sodium hydroxide (50% aqueous), 0.2% TTZ, and 0.1% sodium dodecylbenzene sulfonate (Witconate 1250).

EXAMPLE 9

(Comparative Example)

An antifreeze formulation was prepared comprising a major amount of ethylene glycol, 3.9% DCPDDA, 2.7% sodium hydroxide (50% aqueous), 0.2% TTZ, and 0.1% sodium alpha-olefin sulfonate (Witconate AOS).

EXAMPLE 10

(Control Example)

An antifreeze formulation was prepared comprising a major amount of ethylene glycol, 1.5% sodium hydroxide (50% aqueous), 1.0% octanoic acid, 1.2% sebacic acid, and 0.2% TTZ.

EXAMPLE 11

To the antifreeze formulation of Example 10, 0.1% sodium dodecylbenzene sulfonate (Witconate 1250) was added.

EXAMPLE 12

(Control Example)

An antifreeze formulation was prepared comprising a major amount of ethylene glycol, 1.66% sodium hydroxide (50% aqueous), 1.25% octanoic acid, 1.2% sebacic acid, and 0.2% TTZ.

EXAMPLE 13

To the antifreeze formulation of Example 12, 0.1% alpha olefin sulfonate (Witconate AOS) was added.

EXAMPLE 14

(Control Example)

An antifreeze formulation was prepared comprising a major amount of ethylene glycol, 1.9% sodium hydroxide (50% aqueous) 2.0% octanoic acid, 1.0% sebacic acid, 0.2% TTZ, and 0.3 wt.% of a commercially available polyoxypropylene antifoamant (Pluronic L-61).

EXAMPLE 15

To the antifreeze formulation of Example 14, 0.1 wt.% sodium dodecylbenzene sulfonate (Witconate 1250) was added.

EXAMPLE 16

(Control Example)

An antifreeze formulation was prepared comprising a major amount of ethylene glycol, 3.9% DCPDDA, 2.7% sodium hydroxide (50% aqueous), 0.2% TTZ, and 0.3% 2-ethylhexanoic acid.

EXAMPLE 17

To the antifreeze formulation of Example 16, 0.1% sodium dodecylbenzene sulfonate (Witconate 1250) was added.

EXAMPLE 18

(Control Example)

An antifreeze formulation was prepared comprising a major amount of ethylene glycol, 1.0% sodium metaborate pentahydrate, 1.0% octanoic acid, 0.85% sodium hydroxide (50% aqueous) 1.5% sodium benzoate, 0.2% sodium nitrate, 0.2% sodium nitrite, 0.14% sodium metasilicate pentahydrate, and 0.2% TTZ.

EXAMPLE 19

To the antifreeze formulation of Example 18, 0.1% sodium dodecylbenzene sulfonate (Witconate 1250) was added.

EXAMPLE 20

(Comparative Example)

To the antifreeze formulation of Example 5, 0.2% sodium xylene sulfonate was added.

EXAMPLE 21

(Comparative Example)

To the antifreeze formulation of Example 5, 0.1% sodium diethylenetriamine pentakis-(methylenephosphonate) was added.

Table I sets forth results obtained via the Galvanostatic Pitting Potential Test (Galvanostatic Test) for various examples of the instant invention as well as comparative examples. The Galvanostatic Test gives a measure of the long-term effectiveness of coolants in preventing pitting corrosion attack in aluminum heat exchangers. By applying a current to an aluminium coupon, an accelerated test was developed. In this test, 50 ml of an antifreeze solution (25% solution of the antifreeze formulation in water which contains chloride ions) are added to the test system. A graphite rod is used as the counterelectrode and a standard calomel electrode (SCE) is used for all potential measurements. A current is applied and the most active (most negative) potential ($E_G$) value observed is taken as the most conservative estimate of pitting potential. The higher (more positive) the $E_G$ value is at a fixed current density, the more effective the antifreeze formulation is in preventing pitting corrosion.

positions containing monobasic and dibasic acid/salt corrosion inhibitors but without hydrocarbyl alkali metal sulfonates. The addition of as little as 0.1–0.2 wt.% of sodium dodecylbenzene sulfonate or a $C_{14}$–$C_{16}$ sodium alpha-olefin sulfonate results in great improvements in the pitting protection afforded by the antifreeze/coolant, as exemplified by Examples 2, 6, 6A, 7, 11, 13, 15 17, and 19. Furthermore, hydrocarbyl sulfonate-containing antifreeze/coolant compositions of the instant invention give pitting protection superior to pitting protection given by antifreeze/coolant compositions containing monobasic and dibasic acids/salts together with commercially available surfactants such as ethoxylates and aminophosphonates, as exemplified by Examples 3, 4, and 21.

TABLE I

GALVANOSTATIC PITTING POTENTIAL CORROSION TEST

| Example | Monoacid (wt. %) | Diacid (wt. %) | Sulfonate (wt. %) | Other Additives (wt. %) | $E_G$ (mv vs. SCE) |
|---|---|---|---|---|---|
| 1 | octanoic (0.3%) | terephthalic (1.9%) and sebacic (1.5%) | — | TTZ (0.1%); NaOH (2.9%) | −240 |
| 2 | octanoic (0.3%) | terephthalic (1.9%) and sebacic (1.5%) | Na dodecylbenzene sulfonate (0.1%) | TTZ (0.1%); NaOH (2.9%) | +45 |
| 3 | octanoic (0.3%) | terephthalic (1.9%) and sebacic (1.5%) | — | TTZ (0.1%); NaOH (2.9%); ethoxylated carboxylate (0.1%) | −121 |
| 4 | octanoic (0.3%) | terephthalic (1.9%) and sebacic (1.5%) | — | TTZ (0.1%); NaOH (2.9%); nonylphenol ethoxylate (0.1%) | −290 |
| 5 | octanoic (0.3%) | DCPDDA (3.9%) | — | TTZ (0.2%); NaOH (2.7%) | −229 |
| 6 | octanoic (0.3%) | DCPDDA (3.9%) | Na dodecylbenzene sulfonate (0.1%) | TTZ (0.2%); NaOH (2.7%) | +42 |
| 6A | octanoic (0.3%) | DCPDDA (3.9%) | Na dodecylbenzene sulfonate (0.2%) | TTZ (0.2%); NaOH (2.7%) | +225 |
| 7 | octanoic (0.3%) | DCPDDA (3.9%) | Na alpha-olefin sulfonate (0.1%) | TTZ (0.2%); NaOH (2.7%) | −91 |
| 8 | — | DCPDDA (3.9%) | Na dodecylbenzene sulfonate (0.1%) | TTZ (0.2%); NaOH (2.7%) | −376 |
| 9 | — | DCPDDA (3.9%) | Na alpha-olefin sulfonate (0.1%) | TTZ (0.2%); NaOH (2.7%) | −445 |
| 10 | octanoic (1.0%) | sebacic (1.2%) | — | TTZ (0.2%); NaOH (1.5%) | −76 |
| 11 | octanoic (1.0%) | sebacic (1.2%) | Na dodecylbenzene sulfonate (0.1%) | TTZ (0.2%); NaOH (1.5%) | +1650 |
| 12 | octanoic (1.25%) | sebacic (1.2%) | — | TTZ (0.2%); NaOH (1.66%) | +325 |
| 13 | octanoic (1.25%) | sebacic (1.2%) | Na alpha-olefin sulfonate (0.1%) | TTZ (0.2%); NaOH (1.66%) | +2077 |
| 14 | octanoic (2.0%) | sebacic (1.0%) | — | TTZ (0.2%); NaOH (1.9%); antifoamant (0.3%) | +1775 |
| 15 | octanoic (2.0%) | sebacic (1.0%) | Na dodecylbenzene sulfonate (0.1%) | TTZ (0.2%); NaOH (1.9%); antifoamant (0.3%) | +6635 |
| 16 | 2-ethylhexanoic | DCPDDA (3.9%) | — | TTZ (0.2%); NaOH (2.7%) | −435 |
| 17 | 2-ethylhexanoic | DCPDDA (3.9%) | Na dodecylbenzene sulfonate (0.1%) | TTZ (0.2%); NaOH (2.7%) | +30 |
| 18 | octanoic (1.0%) | — | — | Na metaborate pentahydrate (1.0%); Na benzoate (1.5%); $NaNO_3$ (0.2%); $NaNO_2$ (0.2%); Na metasilicate pentahydrate (0.14%); NaOH (0.85%); TTZ (0.2%) | +227 |
| 19 | octanoic (1.0%) | — | Na dodecylbenzene sulfonate (0.1%) | Na metaborate pentahydrate (1.0%); Na benzoate (1.5%); $NaNO_3$ (0.2%); $NaNO_2$ (0.2%); Na metasilicate pentahydrate (0.14%); NaOH (0.85%); TTZ (0.2%) | +587 |
| 20 | octanoic (0.3%) | DCPDDA (3.9%) | Na xylene sulfonate (0.2%) | TTZ (0.2%); NaOH (2.7%) | −220 |
| 21 | octanoic (0.3%) | DCPDDA (3.9%) | — | TTZ (0.2%); NaOH (2.7%); Na aminophosphonate (0.1%) | −385 |

As illustrated by Table I above, antifreeze formulations comprising aliphatic monobasic and hydrocarbyl dibasic acids or the salts of such acids together with hydrocarbyl $C_{10}$–$C_{20}$ alkylbenzene or alpha-olefin alkali metal sulfonates show improved corrosion inhibiting effectiveness as compared with antifreeze/coolant com- It will be evident that the terms and expressions employed herein are used as terms of description and not of limitation. There is no intention, in the use of these descriptive terms and expressions, of excluding equivalents of the features described and it is recognized that various modifications are possible within the scope of the invention claimed.

The invention claimed is:

1. A corrosion-inhibited antifreeze composition for use in the cooling system of a water cooled internal combustion engine comprising:
   (a) from 80–99 weight percent of a water soluble liquid alcohol freezing point depressant;
   (b) from 0.1–15.0 weight percent of a $C_5$–$C_{16}$ aliphatic monobasic acid or the alkali metal, ammonium, or amine salt of said acid;
   (c) from 0.1–15.0 weight percent of a $C_5$–$C_{16}$ hydrocarbyl dibasic acid or the alkali metal, ammonium, or amine salt of said acid;
   (d) from 0.1–0.5 weight percent of a hydrocarbyl azole; and
   (e) from 0.1–0.5 weight percent of a hydrocarbyl alkali metal sulfonate selected from the group consisting of:
      (i) a $C_{10}$–$C_{20}$ monoalkyl benzene alkali metal sulfonate; and
      (ii) a $C_{10}$–$C_{20}$ alpha-olefin alkali metal sulfonate having an average molecular weight in the range of 200–2000.

2. The corrosion-inhibited antifreeze composition of claim 1, in which said liquid alcohol freezing point depressant is ethylene glycol.

3. The corrosion inhibited antifreeze composition of claim 1, where said $C_5$–$C_{16}$ aliphatic monobasic acid or salt is a $C_8$–$C_{12}$ aliphatic monobasic acid or the alkali metal, ammonium, or amine salt of said acid, present in a concentration range of 0.1–5.0 weight percent.

4. The corrosion inhibited antifreeze composition of claim 3, where said $C_8$–$C_{12}$ aliphatic monobasic acid is selected from the group consisting of octanoic acid, nonanoic acid, decanoic acid, undecanoic acid, dodecanoic acid, 2-ethylhexanoic acid, and neodecanoic acid.

5. The corrosion inhibited antifreeze composition of claim 1, where said $C_5$–$C_{16}$ hydrocarbyl dibasic acid or salt is a $C_8$–$C_{12}$ aliphatic dibasic acid or the alkali metal, ammonium, or amine salt of said acid, present in a concentration range of 0.1–5.0 weight percent.

6. The corrosion inhibited antifreeze composition of claim 5, where said $C_8$–$C_{12}$ aliphatic dibasic acid is selected from the group consisting of: suberic acid, azelaic acid, sebacic acid, undecanedioic acid, dodecanedioic acid, and the diacid of dicyclopentadiene.

7. The corrosion inhibited antifreeze composition of claim 1, where said $C_5$–$C_{16}$ hydrocarbyl dibasic acid or salt is a $C_8$–$C_{12}$ aromatic dibasic acid or the alkali metal, ammonium, or amine salt of said acid, present in a concentration range of 0.1–5.0 weight percent.

8. The corrosion inhibited antifreeze composition of claim 7, where said $C_8$–$C_{12}$ aromatic dibasic acid is terephthalic acid.

9. The corrosion inhibited antifreeze composition of claim 1, where said hydrocarbyl azole is tolyltriazole or benzotriazole, present in a concentration range of 0.1–0.3 weight percent.

10. The corrosion inhibited antifreeze composition of claim 1, in which an additional corrosion inhibitor is also employed at concentrations of 0.01–5.0 weight percent, and is selected from the group consisting of alkali metal hydroxides, alkali metal borates, alkali metal silicates, alkali metal benzoates, alkali metal nitrates, alkali metal nitrites, and alkali metal molybdates.

11. The corrosion inhibited antifreeze composition of claim 1, in which said alkyl benzene alkali metal sulfonate is sodium dodecylbenzene sulfonate.

12. The corrosion inhibited antifreeze composition of claim 1, in which said alpha olefin alkali metal sulfonate is a $C_{14}$–$C_{16}$ sodium alpha olefin sulfonate, having an average molecular weight in the range of 300–500.

13. The corrosion inhibited antifreeze composition of claim 1, where said antifreeze composition is diluted with from 10–90 weight percent of water.

14. The corrosion inhibited antifreeze composition of claim 13, where said antifreeze composition is diluted with from 25–75 weight percent of water.

* * * * *